United States Patent Office
3,514,326
Patented May 26, 1970

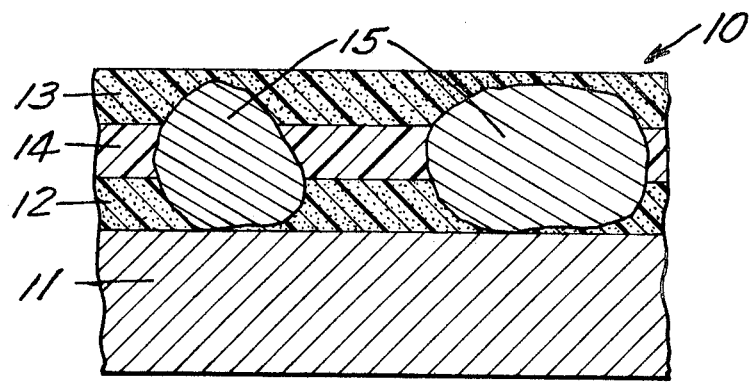

3,514,326
TAPE
Robert H. Stow, White Bear Lake, Minn., assignor to Minnesota Mining and Manufacturing Company, St. Paul, Minn., a corporation of Delaware
Filed Nov. 17, 1967, Ser. No. 683,902
Int. Cl. H05k 1/02
U.S. Cl. 117—227                      6 Claims

ABSTRACT OF THE DISCLOSURE

An electrically conductive adhesive transfer tape comprising first and second exterior adhesive layers and an intermediate support layer between the two adhesive layers; electrically conductive particles, arranged essentially in a monolayer, are located in the support layer and extend close to the adhesive surfaces.

Background of the invention

The first known electrically conductive pressure-sensitive-adhesive transfer tape—that is, a thin sheet of adhesive having two adhesive surfaces, transferable from one substrate to another, and electrically conductive from adhesive surface to adhesive surface—consisted of a single layer of adhesive in which short fibers were dispersed for reinforcement and in which electrically conductive metal particles slightly less in thickness than the thickness of the tape were distributed in a crude monolayer to provide electrical conductivity. The tape was carried on a release liner and in use was applied to a substrate—such as a special tape backing to which the direct application of a conductive layer of adhesive was not economical, or to a surface of a sheet-type article for adhesion to a similar article—by pressing the exposed surface of the tape against the substrate and removing the liner.

In fact, this previous tape performed poorly, principally because of interference between the reinforcing fibers and the metal particles. This interference of the fibers with the particles dislocated the particles from the intended monolayer so that the particles protruded outside the surface of the tape and seriously reduced adhesion of the tape. Some tapes were made excessively thick to prevent protrusion, but the consequence of that was poor electrical conductivity through the tape.

Summary of the invention

With this invention a new well-reinforced adhesive transfer tape is provided that also has excellent electrical conductivity through the tape. The reinforcement in this new tape is provided with a thin support layer centrally disposed in the tape with layers of adhesive disposed on each side of the support layer. The support layer is formed from a material that is higher in tensile strength and rigidity than the adhesive material of the tape (the support layer generally exhibiting a tensile stress of at least five ounces per inch of width at an elongation of five percent, for example). Electrical conductivity through the tape is provided with electrically conductive particles arranged essentially in a monolayer in the tape; the particles are sufficiently thick that they extend through the support layer close to the exterior adhesive surfaces of the tape.

This tape is typically made by first coating a dissolved adhesive material loaded with the conductive particles onto a release liner, which serves as the release carrier of the tape. The thickness of solution coated and the solids content of the solution are chosen such that as the coated solution dries, a thin adhesive layer is formed from which substantially uncovered portions of the particles protrude. Next in this typical method, the support layer is coated from solution over the first adhesive layer, with the amount coated being chosen so that the thickness of the dry support layer is equal to or less than the thickness of the exposed portion of the particles. Finally, the second layer of adhesive is coated over the support layer.

The resulting tape has excellent application properties, with good adhesion to a substrate (at least 10 ounces per inch of width) and easy, uniform transfer without distortion to a substrate. Although the support film can be made quite thin, so that the tape is quite thin, the tensile strength and rigidity of the tape is high, and the tape can be unwound readily from a storage roll. Preferred forms of the tape have a very low electrical resistance through the tape, on the order of 0.0005 ohm per square inch.

Detailed description

An exemplary tape 10 of this invention made by the procedure described above is illustrated in the drawing. The tape 10 is carried on a release liner 11 (the word "tape" is used herein to mean the transfer material exclusive of the liner) and includes two adhesive layers 12 and 13 and an intermediate support layer 14 disposed between and adhered to the adhesive layers. Electrically conductive particles 15 are distributed essentially in a monolayer in the tape and are of a size such that they extend through the support layer and close to the adhesive surfaces (a very thin film of the material of the support layer may cover the tops of the particles when the tape is formed by the coating process described above). As illustrated, when the tape is made by the coating process described above, the particles 15 generally come to rest on the release liner 11, so that one edge coincides with one surface of the tape, and electrical conduction occurs from a substrate to which this surface of the tape is applied directly or almost directly through the conductive particles.

It is theorized that the adhesive material immediately above the particles of the tape 10 rapidly undergoes dielectric breakdown when a field is impressed across the tape. As a result a conductive path is formed through the adhesive and the conductive particles. To be useful in this conduction process, the particles should have a substantial thickness in relation to their length and width (generally their thickness or height is at least about 25 percent of the average of their length and width). Further, to achieve the desired conductivity the thickness of the particles should be less than the thickness of the tape by not more than 2.5 mils, and preferably by not more than 0.5 mil. Thus, in a typical tape of this invention in which one edge of the particles almost exactly coincides with one surface of the tape, the opposite edge of the particles should be not more than about 2.5 mils, and preferably not more than about 0.5 mil, from the edge of the other adhesive surface.

To increase the number of particles participating in conduction, they should be rather similar in thickness, having diameters that differ by not more than about 1 mil and preferably by not more than about 0.5 mil. It will be recognized that the particles in a commercial lot are generally in a range of sizes, and to obtain the desired similarity in size commercial lots are typically screened to establish a narrower range of sizes. Further similarity in particle thickness is obtained by a method in which a commercial lot of spheroidal particles is first screened so that the larger particles of the screened batch are just slightly larger in diameter than the thickness of the tape. This screened batch of spheroidal particles is then passed, usually while carried in a liquid vehicle, through a device such as a paint mill to flatten these particles of larger diameter to an appropriate thickness. The flattened particles are found to lie on their flattened side in the tape of the invention, and since each is flattened to approximately the same thickness the tape includes many particles of similar thickness.

To achieve the desired conductivity, particles having a thickness that is not less than the tape thickness by more than 2.5 mils and preferably by not more than 0.5 mil, should be included in a volume amount of at least 0.1 percent, and preferably at least one percent, of the volume of the tape. On the other hand, since essentially none of the particles should extend above the surface of the adhesive if satisfactory adhesion values are to be obtained, the volume amount of substantially spherical particles should be less than about 40 percent of the volume of the tape. Since flattened particles have a greater tendency to overlie one another than spherical particles, flattened particles should be used in a lesser amount than spherical particles. Generally the particles will constitute between 1 and 15 percent of the volume of the tape.

Copper or aluminum particles are most commonly used in tapes of this invention, but other metal particles or other electrically conductive particles may be used. Although copper catalyzes the degradation of most adhesive polymers over a period of time, and consequently changes their adhesive and cohesive properties, long-lived compatible mixtures of adhesive material and particles can be obtained through incorporation in the adhesive material of antioxidants and chelating-type inhibitors, as taught in the copending application of Robert H. Stow, Ser. No. 486,619, filed Sept. 13, 1965.

Any film-forming material capable of the needed adhesive properties, usually pressure-sensitive adhesive properties, may be used as the adhesive material of the layers 12 and 13. Many natural and synthetic polymeric bases are available for pressure-sensitive-adhesive tapes, including acrylates, polyvinyl ethers, copolymers of polyvinyl acetate, and polyisobutylene, as well as natural, SBR, neoprene, and silicone rubbers. A quite insulative adhesive material may require that the covering of the adhesive material on the particles be somewhat less in thickness than previously indicated.

The material for the support layer 14 should be a film-forming material capable of the needed strength and rigidity when formed in a rather thin film. A previously indicated, to provide the desired support for the tape, the support layer should exhibit a tensile stress of at least five ounces per inch of width at an elongation of less than five percent; more preferably, the support film will exhibit a tensile stress of 40 or 50 ounces or more per inch of width at an elongation of five percent. Useful materials for the support layer 14 include polymers based on ethyl or methyl methacrylate, polycarbonate, ethyl cellulose, cellulose acetate, polyamide, polypropylene, and polystyrene.

The layers of the tape are typically coated from a liquid, most often from a finely divided mixture of the film-forming material in a volatile agent, such as a solution or emulsion, but the coating material might also be a melt of the material or a polymerizable mixture of monomers. The material of the support layer should form a solution (or other coatable liquid such as emulsion or melt) low in viscosity so that the solution will flow away from the tops of the particles as it dries. Also the solvent of the solution should be one that either does not dissolve or in other ways act on the adhesive material or that will evaporate rapidly before any serious solution of the adhesive material occurs. Most often, the tape will be a three-layer tape, but primer or barrier layers may be coated between the adhesive and support layers, or the tape may include other layers such as two adjacent support layers. For example, if an adhesive material is used that is incompatible in some way with the material of the support layer, thin barrier layers are coated between the adhesive layers and the support layer. (The description of a layer as adhered to another layer or as being coated over another layer is applied herein both to tapes in which an intermediate layer is coated between the two specifically mentioned layers as well as tapes in which the two layers are in direct contact.)

It will be recognized that the tape of this invention can be provided in various sizes depending on the particular need. With some polymers, adequate reinforcement is obtained with a support film as thin as 0.05 mil, but most often the thickness of the support layer is as least about 0.1 mil. For the best adhesion the adhesive layers should be at least 0.5 mil in thickness, but adequate adhesion for some uses can be obtained with an adhesive layer as thin as 0.1 mil. In the more typical tapes of this invention, the conductive particles are about 1.5 mils thick, the support layer is about 0.3 mil thick and the adhesive layers are about 0.7 mil thick. However, the thinness of the intermediate support layer, which is made practicable by its formation by a coating process, makes possible very thin, well-reinforced, pressure-sensitive-adhesive transfer tapes. Past transfer tapes reinforced with fibers or in other ways, have generally not been less than 1.5 or 2 mils in thickness. But now, well-reinforced transfer tapes less than 1.5 mils in thickness, which have special utility because of their thinness, are readily made by forming the three layers by a coating process. Almost always, the thickness of tapes of this invention will not exceed about 5 mils.

The invention is further illustrated in the following examples (parts and percents are by weight unless otherwise indicated):

Example 1

A batch of spherical silver particles was screened from a commercial lot with 200-mesh and 325-mesh screens (U.S. Standard Sieve Series; made by W. S. Tyler Co., the particles left after the screening having a diameter between 1.7 and 2.9 mils). Three-hundred-ten grams of these particles were mixed in 1000 grams of light mineral oil and this mixture was passed through a three-roll paint mill with the gaps between the rolls set at one mil. The resulting flattened particles were washed repeatedly with heptane to free them of mineral oil and then dried.

The material for the first adhesive layer of the tape of this example included the following ingredients:

| | Parts |
|---|---|
| Natural rubber (smoked sheets) | 400 |
| Antimony trioxide | 42 |
| 4,4 thio bis(6 tert-butyl meta cresol) antioxidant (Santanox R) | 12 |
| Polyterpene resin having a melting point of 115° C. by the ring and ball method (Hercules 1010) | 400 |
| Heptane | 3372 |

The natural rubber, antimony trioxide, and Santanox R anti-oxidant were mixed together on a rubber mill, and the resulting mixture dissolved together with the polyterpene resin in the heptane.

Eight-hundred-forty-five parts of this solution of adhesive material was combined and thoroughly mixed with 168 parts of the flattened silver particles. The particle-loaded solution was knife-coated onto silicone-treated release paper (60-pound release paper made by the Daubert Chemical Co.) using an orifice of four mils, after which the coated web was dried for about 100 seconds at 130° F., leaving a thin layer of adhesive from which the silver particles projected.

Next, a solution of poly n-butyl methacrylate in ethyl acetate (20 percent solids) was coated over the particle-loaded adhesive film. The coating apparatus included an idler roller over which the web of coated release paper passed, a one-inch diameter roll spirally wrapped with six-mil diameter wire (Meyer bar) above the web about two inches beyond the idler roller, and a second idler roller under the web two inches beyond the Meyer bar. The Meyer bar was locked to prevent it from turning and was located at a height such that its bottom surface was below the top of the idler rollers. The solution was added just before the web passed under the Meyer bar. After coating, the web was dried for about 160 seconds at 130° F. and then 100 seconds at 200° F., with the tops of the particles still projecting through the coated layers.

The material for the second adhesive layer was prepared from the same ingredients and by the same procedure as the material of the first adhesive layer except that 42 grams of zinc oxide were used instead of the 42 grams of antimony trioxide and particles were not included. This adhesive layer was applied over the support film by knife-coating, using an orifice of seven mils above the top of the release liner. The web was next heated 260 seconds at 130° F. followed by 100 seconds at 200° F., and then slit into one-inch wide rolls.

The thickness of the tape was 1.3 mils, with the thickness of the first and second adhesive layers and the support layer estimated to be 0.5, 0.5, and 0.3 mil, respectively. The tensile strength of the support layer at an elongation of five percent was estimated to be 40 ounces per inch of width. It was estimated that the particles constituted 3.5 volume percent of the tape. When a strip of the tape was pressed against a substrate and the liner removed, all the transfer tape remained firmly against the substrate. Adhesion was measured, as described in ASTM D–1000, by peeling the tape at 180° from a test surface at a rate of 12 inches per minute. A conventional pressure-sensitive adhesive tape with a substantially nonextensible backing was adhered against the transfer tape to support it as it was peeled. As measured in this manner, the tape exhibited an adhesion of 37 ounces per inch of width on the surface of the first adhesive layer and an adhesion of 35 ounces per inch of width on the surface of the second adhesive layer.

The resistance through the tape was measured by first laying the exposed adhesive surface of the tape against a gold-plated brass electrode having a surface area of one square inch, and then removing the liner from the tape. A second gold-plated brass electrode having a surface area of one square inch was then laid on the adhesive side of the tape in alignment with the first electrode and a weight was applied to the top electrode sufficient to produce a pressure of five pounds per square inch. An electrical power supply was connected across the electrodes, and a rheostat in the circuit adjusted so that the power supply delivered 0.1 ampere. A volt meter, also connected across the electrodes, measured the voltage drop from which the resistance was calculated. Using this method it was found that the tape of this example exhibited a resistance through the tape of 0.0005 ohm per square inch.

Example 2

A solution of the material of the first adhesive layer was prepared by first dissolving 250 grams of a copolymer of isooctyl acrylate (96 percent) and acrylamide (4 percent) in 1031 grams of ethyl acetate and mixing in 2.5 grams of disalicylalpropylene diamine (Copper Inhibitor 50) as inhibitor and 7.5 grams of 4,4 thio bis(6 tert-butyl meta cresol) as antioxidant. Into 103 grams of this solution were mixed 24 grams of the same flattened silver particles used in Example 1, after which the particle-loaded solution was knife-coated on a release liner using an orifice of four mils; after coating, the web was dried one minute at 150° F.

The support layer of the tape was provided by knife-coating over the first adhesive layer a solution (20 percent solids) of polystyrene (Styron 690) in a 20/80 mixture of toluene and heptane. An orifice two mils above the top of the release liner was used, and the coated web was dried one minute at 180° F.

The second adhesive layer was coated over the support layer by knife-coating the acrylate adhesive material described above without the silver particles. The coating orifice was seven mils above the top of the release liner, and after coating the web was dried one minute at 150° F.

This tape exhibited good transfer to a substrate, and when tested for adhesion in the manner described in Example 1 exhibited an adhesion of 12 ounces per inch of width on the surface originally coated and 20 ounces per inch of width on the surface coated with the second adhesive layer. The resistance through the tape, as measured in the manner described in Example 1, was 0.0004 ohm per square inch. The thickness of the tape was 2.3 mils, and it was estimated that the thickness of the first and second adhesive layers and of the support layer was 0.5, 0.8, and 1.0 mil, respectively. The tensile stress of the support layer was estimated to be 200 ounces per inch of width at 5 percent elongation. The particles were estimated to account for 2.5 volume-percent of the tape.

Example 3

An adhesive material was mixed from the following ingredients:

| | Parts |
|---|---|
| Copolymer of isooctyl acrylate (96%) and acrylamide (4%) | 500 |
| Ethyl acetate | 1880 |
| 4,4 thio bis(6 tert-butyl meta cresol) (Santanox R) | 15 |
| Disalicylal propylene diamine (Copper Inhibitor 50) | 5 |

Fourteen-hundred parts of spherical copper particles cut from a commercial lot with 200 and 325-mesh screens were mixed into the above adhesive mixture. The particle-loaded adhesive material was then passed through a three-roll paint mill, with the gaps between the first and second, and second and third rolls set at about two mils and one mil, respectively. The particle-loaded solution was knife-coated on a release liner using a two-mil orifice, and the coated web then dried for 260 seconds at 135° F.

The support layer was coated using the Meyer bar apparatus described in Example 1, the material coated including 500 grams of poly n-butyl methacrylate (Elvacite 2044), 15 grams of Santanox R, and 5 grams of Copper Inhibitor 50 dissolved in 2000 grams of ethyl acetate. The web was dried for 415 seconds at 135° F. followed by 260 seconds at 200° F.

The second adhesive layer was knife-coated over the support layer using an orifice four mils above the top of the first coating and using the same solution of adhesive material as in the first layer, but without copper particles.

The thickness of the completed tape was 2.4 mils, and it was estimated that the thickness of the first and second adhesive layers and the support layer was 1.2, 0.9, and 0.3 mil, respectively. The tensile stress of the support layer was estimated as about 40 ounces per inch of width at 5 percent elongation. It was estimated that the particles constituted about 15 volume percent of the tape. When the tape was fresh, the adhesion of the tape was measured at 28 ounces per inch of width on the first adhesive layer's surface and 15 pounds per inch of width on the second adhesive layer's surface; after the tape had been aged five days at 150° F., the adhesion on the first adhesive layer's surface was 20 ounces per inch of width, and on the second adhesive layer's surface was 21 ounces per inch of width. The resistance through the tape was 0.0005 ohm per square inch when the tape was fresh, while after aging of the tape for five days at 150° F., the resistance was 0.0010 ohm per square inch. The tape transferred to a substrate uniformly and the liner could readily be removed without disturbing the transferred tape.

I claim:

1. A reinforced adhesive transfer tape that is electrically conductive from adhesive surface to adhesive surface comprising first and second layers of adhesive, a thin cohesive support layer that exhibits a tensile stress of at least about five ounces per inch of width at an elongation of five percent disposed between and adhered to the layers of adhesive, and essentially a monolayer of electrically conductive particles having a substantial thickness in relation to their length and width located in and extending through said support layer, the thickness of the particles being less than the thickness of the tape by not more than about 2.5 mils, and substantially none of the particles extending through the exterior surfaces of the tape.

2. The tape of claim 1 in which the thickness of the particles is less than the thickness of the tape by not more than about 0.5 mil.

3. The tape of claim 1 in which the particles constitute between about 0.1 and 40 volume-percent of the tape.

4. A pressure-sensitive-adhesive transfer tape of claim 1 in which the first and second layers of adhesive are each at least about 0.5 mil thick; the support layer is between about 0.1 and 1.0 mil in thickness and exhibits a tensile stress of at least 40 ounces per inch of width at an elongation of five percent; the electrically conductive particles constitute between 0.1 and 40 volume-percent of the tape; and the thickness of the particles is less than the thickness of the tape by not more than about 0.5 mil.

5. The tape of claim 4 in which the particles are selected from copper and aluminum particles.

6. The tape of claim 4 in which at least one adhesive layer comprises an acrylate-based adhesive material.

References Cited
UNITED STATES PATENTS

| | | | |
|---|---|---|---|
| 2,498,493 | 2/1950 | Hickernell | 117—122 XR |
| 2,808,352 | 10/1957 | Coleman et al. | 117—227 |

WILLIAM L. JARVIS, Primary Examiner

U.S. Cl. X.R.

117—68.5, 122; 264—104, 216